(12) United States Patent
Nishikawa (10) Patent No.: US 7,126,567 B2
(45) Date of Patent: Oct. 24, 2006

(54) FULL-COLOR DISPLAY DEVICE

(75) Inventor: Ryoichi Nishikawa, Nagoya (JP)

(73) Assignee: DENSO Corporation, Kariya (JP)

( * ) Notice: Subject to any disclaimer, the term of this patent is extended or adjusted under 35 U.S.C. 154(b) by 488 days.

(21) Appl. No.: 10/636,671

(22) Filed: Aug. 8, 2003

(65) Prior Publication Data

US 2004/0027041 A1 Feb. 12, 2004

(30) Foreign Application Priority Data

Aug. 9, 2002 (JP) ............... 2002-232517

(51) Int. Cl.
*G09G 3/36* (2006.01)
(52) U.S. Cl. ..................... 345/77; 345/102
(58) Field of Classification Search ............ 345/87, 345/88, 90, 99, 100, 102, 105, 204, 690, 345/212, 214, 39, 42, 46, 51, 63, 77, 589, 345/592, 597; 340/525, 815.42, 815.45
See application file for complete search history.

(56) References Cited

U.S. PATENT DOCUMENTS

| | | | |
|---|---|---|---|
| 5,185,602 A * | 2/1993 | Bassetti et al. ............... 345/89 |
| 6,734,841 B1 * | 5/2004 | Seibold et al. ............... 345/102 |
| 6,870,525 B1 * | 3/2005 | Kawabata et al. ........... 345/102 |
| 6,907,146 B1 * | 6/2005 | Bartell et al. ................ 382/312 |
| 6,943,770 B1 * | 9/2005 | Garcia et al. ................ 345/102 |
| 6,954,216 B1 * | 10/2005 | Dowling et al. ............. 345/593 |
| 2002/0070914 A1 * | 6/2002 | Bruning et al. ............... 345/102 |
| 2002/0135553 A1 * | 9/2002 | Nagai et al. .................. 345/89 |
| 2002/0171792 A1 * | 11/2002 | Kubota et al. ............... 349/114 |
| 2003/0016205 A1 * | 1/2003 | Kawabata et al. ........... 345/102 |
| 2004/0140972 A1 * | 7/2004 | Hirota et al. ................ 345/204 |
| 2004/0233225 A1 * | 11/2004 | Guillemot .................... 345/690 |

FOREIGN PATENT DOCUMENTS

JP A-11-91461 4/1999

* cited by examiner

*Primary Examiner*—Nitin Patel
(74) *Attorney, Agent, or Firm*—Posz Law Group, PLC (57) ABSTRACT

A full-color liquid crystal display device (TFT-LCD) installed in a monitor system for a vehicle includes a liquid crystal display (LCD), an LCD electronic control unit (ECU). The LCD has a backlight unit that includes white LEDs and red LEDs. The LCD ECU performs a display control process for selectively displaying navigation information, a tachometer image, or other information. A warning sign is displayed in a single color red in a display area of the LCD if required. The LCD ECU selects information to display and determines whether the information is a warning. If the information is a warning, the white LEDs and the red LEDs are turned on for displaying a warning sign indicative of the warning at high intensity so that the sign is easily recognized. If the information is not a warning, only the white LEDs are turned on.

17 Claims, 6 Drawing Sheets

FULL-COLOR DISPLAY DEVICE

CROSS REFERENCE TO RELATED APPLICATION

This application is based on and incorporates herein by reference Japanese Patent Application No. 2002-232517 filed on Aug. 9, 2002.

FIELD OF THE INVENTION

The present invention relates to a full-color display device for displaying full-color images by controlling intensity of three primary colors of light, which are red, green, and blue (RGB), in each pixel.

BACKGROUND OF THE INVENTION

For full-color display devices, a liquid crystal display (LCD), a plasma display panel (PDP), and an electroluminescent display (ELD) are commonly known. The LCD is a reactive-type (non-luminescent-type) display and has a display region consists of many pixels. Each pixel is divided into a red (R) region, a green (G) region, and a blue (B) region. The R, G, and B regions have a red filter, a green filter, and a blue filter, respectively. RGB components in a white light emitted from the backlight unit are selectively passed to a front surface of the LCD. In the LCD, a full-color image is displayed by adjusting a balance of the RGB components. The balance is adjusted by controlling a voltage applied to a liquid crystal cell corresponding to each region of each pixel.

The PDP is an emissive-type display that includes a discharge cell for each RGB region of each pixel. For example, the discharge cell arranged corresponding to a red region emits a red light when red phosphors are exposed to ultraviolet rays produced by a discharge and excited. RGB components of light are balanced by controlling the intensity of the discharge cell corresponding to each RGB region for full-color display.

A full-color display device displays meters, warning signs, and navigation information is proposed in JP-A-11-91461. In this device, the warning signs are displayed in red or orange. However, the visibility of the warning sings is not good if they are lit in one of or close to the three primary colors, such as red or orange. This is because two other colors in each pixel used for warning display are blocked by the LCD layer and the intensity is reduced to one third of white luminance. In the case of the PDP and ELD, the light emission of the two colors is reduced and the intensity is also reduced to one third of white luminance.

SUMMARY OF THE INVENTION

The present invention therefore has an objective to provide a full-color display device in which the intensity of display in color similar to one of the RGB colors. A full-color display device of the present invention includes a display panel, a light source unit, and a display control means. The display panel includes a display screen composed of a plurality of pixels. The light source unit is arranged behind the display panel for emitting light including the RGB components toward the display panel. The display control means controls intensity of the components for displaying a full-color on the display screen.

The display control means controls the light source unit to emit light at high intensity when displaying a warning sign or other items on the screen in a single color similar to one of the RGB. By emitting light for displaying warning sign or other items at high intensity, the visibility of the sign or the items improves.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings. In the drawings, the same numerals are used for the same components and devices.

First Embodiment

Figure 1:
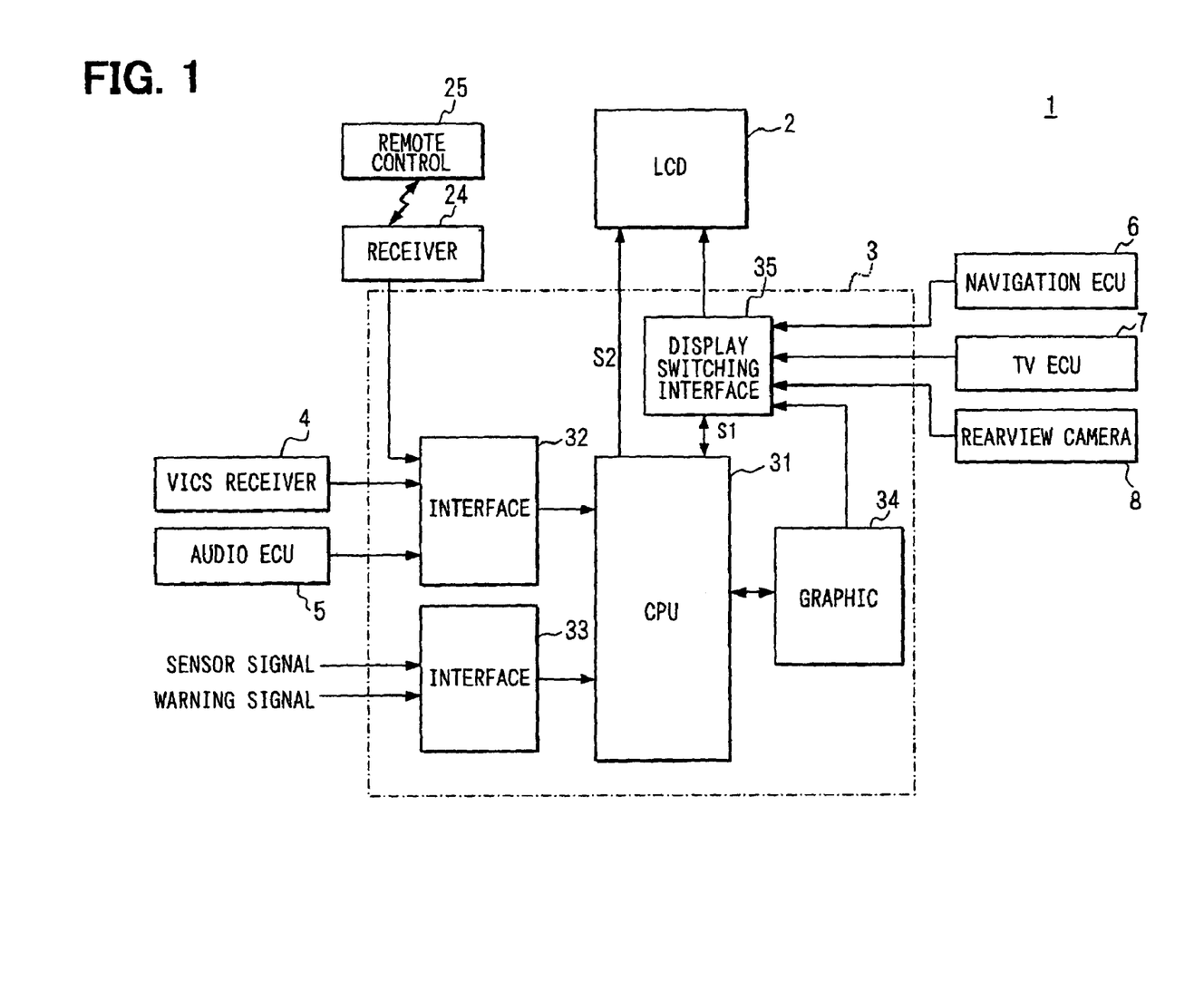
FIG. 1 is a block diagram a vehicular monitor system in which a full-color display device of the present invention is included.

Referring to FIG. 1, a display device includes a sidelight-type thin film transistor (TFT) liquid crystal display (LCD) 2 and an LCD electronic control unit (ECU) 3 that controls the LCD 2. The display device is included in a monitor system 1 that provides various kinds of information to a user in a vehicle. The user can selects information to be displayed on the LCD via a remote control device 25. A remote control signal is transmitted from the remote control device 25 to the LCD ECU 3 via a receiver 24.

The monitor system 1 includes the LCD 2, the LCD ECU 3, a vehicle information and communication system (VICS) receiver 4, an audio ECU 5, a navigation ECU 6, a television (TV) ECU 7, and a rear monitor camera 8. The LCD 2 is mounted in an instrument panel of a vehicle at a position visible from a driver. The ECU 3 is a display control means and connected to the LCD 2 in the instrument panel. The VICS receiver 4, the audio ECU 5, the navigation ECU 6, the TV ECU 7, and the rear monitor camera 8 are all connected to the ECU 3. The LCD 2 and the ECUs 3, 4, 5, 6, 7 are activated when the user turns on an accessory switch for powering up the monitor system 1.

The VICS receiver 4 receives VICS information, and outputs VICS signals indicative of the information to the LCD ECU 3. The audio ECU 5 outputs signals indicative of information about CD, MD, cassette players and a radio to the LCD ECU 3. The navigation ECU 6 determines a current position of the vehicle based on signals from a global positioning system (GPS) receiver (not shown). It also reads map data from CD-ROM, DVD-ROM, or HDD (not shown), and image signals indicative of information about the current position of the vehicle and a map to the LCD ECU 3. The TV ECU 7 outputs image signals from the TV tuner (not shown) to the LCD ECU 3.

Furthermore, the LCD ECU 3 receives sensor signals from various sensors via in-vehicle LAN (not shown) and warning signals from an engine oil pressure switch. The sensor signals include a speed signal indicative of a vehicle speed, an ignition signal indicative of engine revolutions, and a REV signal indicative of a gear in a reverse position. The warning signals indicate, for instance, a low engine oil pressure.

Figure 2A:
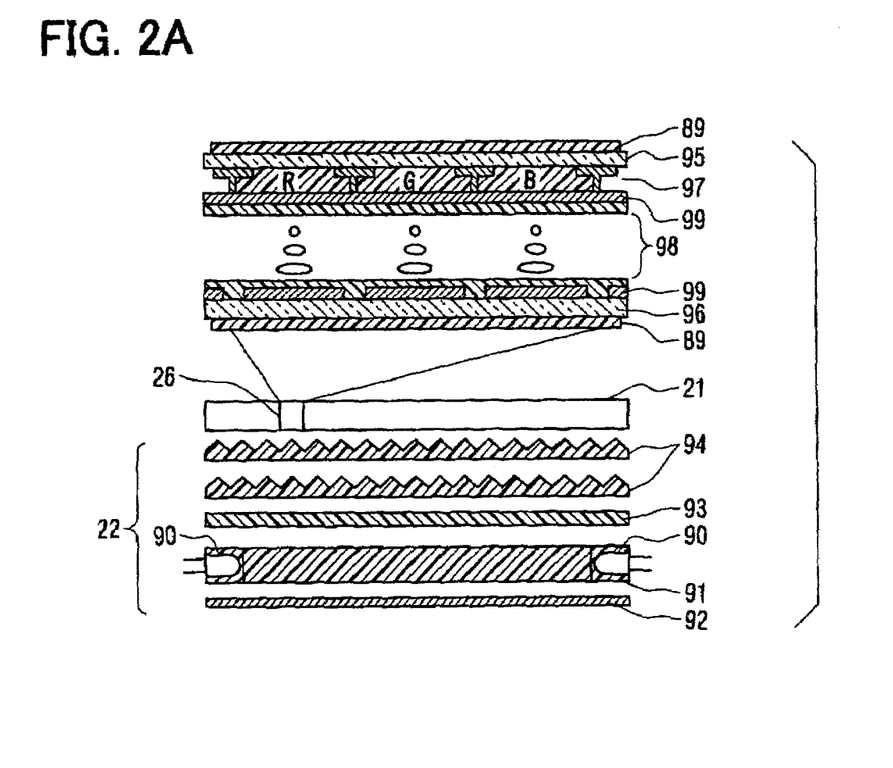
FIG. 2A is a cross-sectional view of an LCD included in the full-color display device.

Referring to FIG. 2A, the LCD 2 includes a TFT panel 21, which is a display panel, and a backlight unit 22, which emits light toward the back of the TFT panel 21. The backlight unit 22 is a light source unit constructed of an LED 90, an acrylic light guide plate 91, a reflector sheet 92, a diffuser sheet 93, and a prism sheet 94. The LED 90 is a light source, and the acrylic plate 91 guides light from the light source. The reflector sheet 92 is arranged under the acrylic plate 91 for reflecting the light leaked under the acrylic plate 91. The diffuser sheet 93 is arranged above the acrylic plate 91 for improving uniformity of the intensity. The prism sheet 94 is arranged above the diffuser sheet 93 for improving the intensity.

The TFT panel 21 includes a front glass substrate 95, a rear glass substrate 96, a color filter layer 97, a liquid crystal layer 98, and electrodes 99. The color filter layer 97, the liquid crystal layer 98, and the electrodes 99 are formed between the front and the rear glass substrates 95, 96. The color filter layer 97 and the liquid crystal layer 98 are provided for color-specifically passing the light emitted from the backlight unit 22. The electrodes 99 are provided for applying a voltage to the LCD layer 98. The TFT panel 21 further includes polarizing film 89 on the outer surfaces of the glass substrates 95, 96 for deflecting light emitted from the backlight unit 22.

Figure 2B:
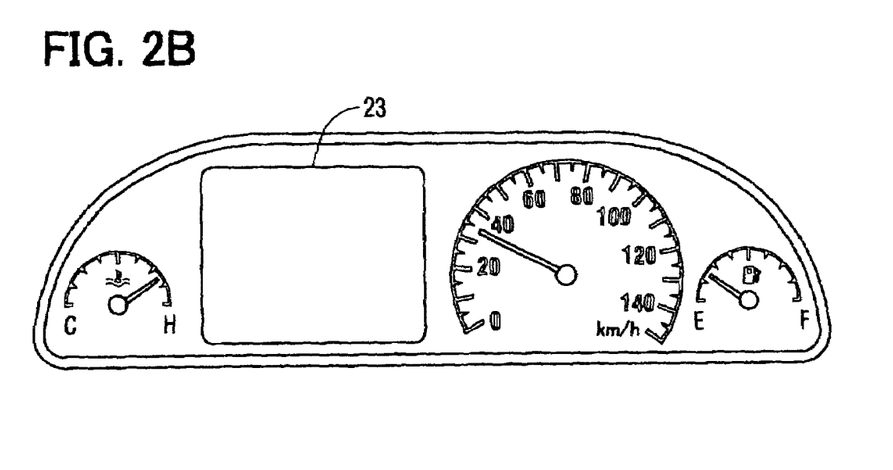
FIG. 2B is a front view of the LCD mounted in an instrument panel.
Figure 3:
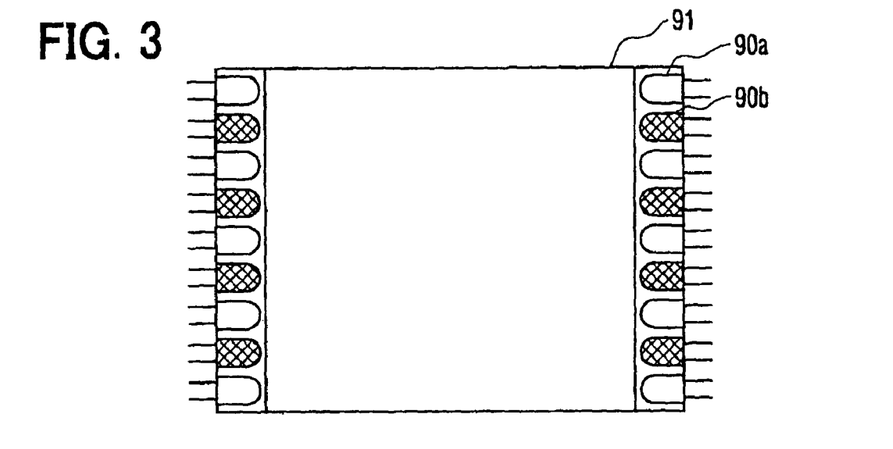
FIG. 3 is a schematic view of the LCD showing arrangements of light sources (LEDs) according to the first embodiment of the present invention.

A display screen 23 (display region) is formed at the top surface of the TFT panel 21. The screen 23 appears adjacent to a speedometer when the LCD 2 is installed in the instrument panel. The color filter layer 97 has a red filter R, a green filter G, and a blue filter B for each pixel 26 that is an element of the screen 23. Full-color images can be displayed on the screen by controlling voltages applied to the LCD layer 98. The LEDs 90 including white LEDs 90a and red LEDs 90b are placed at the side edges of the light guide plate 91 in order as shown in FIG. 3.

The LCD ECU 3 includes a CPU 31, first and second interface circuits 32, 33, a graphic circuit 34, and a display switching interface circuit 35. The first interface circuit 32 receives remote control signals from the receiver 24, VICS signals from the VICS receiver 4, audio signals from the audio ECU 5. Then, it produces LCD operation data, VICS information, and audio information. The second interface circuit 33 receives sensor signals and warning signals, and produces vehicle condition data including vehicle speed data, engine revolutions data, and warning data. The data produced by the first and the second interface circuits 32, 33 is received by the CPU 31.

The CPU 31 selects the information to be displayed on the screen 23 from various kinds of information based on the LCD operation data or the vehicle condition data. The LCD operation data includes operating instruction inputted by the user via the remote control device 25. The various kinds of information include navigation, TV, rearview camera, VICS, audio, tachometer, trip meter, and warning based on the LCD operation data or the vehicle condition. The CPU 31 outputs a display signal S1 to the display switching interface circuit 35 for displaying the selected information.

The graphic circuit 34 produces image display signals indicative of a warning sign, a tachometer, a trip meter, VICS information, or audio information when instructed by the CPU 31. Then, the graphic circuit 34 outputs the signals to the switching interface circuit 35. The switching interface circuit 35 selects an image signal among the signals from the graphic circuit 34, the navigation ECU 6, TV ECU 7, and the rearview camera 8 based on the display signal S1. Then, it outputs the selected signal to the LCD 2.

Figure 4:
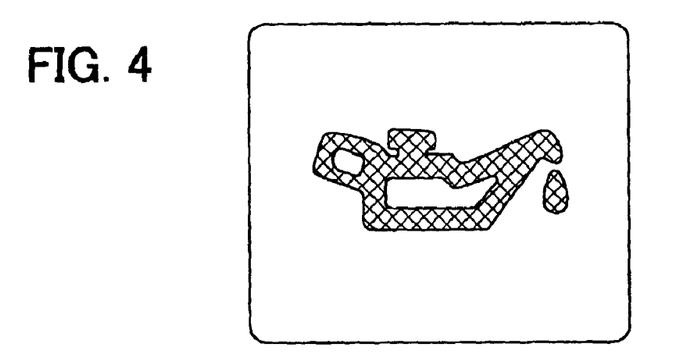
FIG. 4 is a front view of the LCD on which a warning sign is displayed.

By the above operations, the images of the tachometer, the warning signs, the navigation information and other information are selectively displayed on the screen 23. When abnormal conditions occur in the vehicle, the display signal S1 is produced by the CPU 31 for displaying a warning sign on the screen 23. The images displayed on the screen 23 are switched when the display signal S1 is inputted to the LCD 2. The warning sign is displayed in a single color red. For example, an engine oil warning sign is displayed in red on the screen 23 as shown in FIG. 4 when a low engine oil level is detected. Likewise, the display signal S1 is produced by the CPU 31 for displaying emergency information on the screen 23 when the VICS receiver device 4 has received the emergency information.

Figure 5:
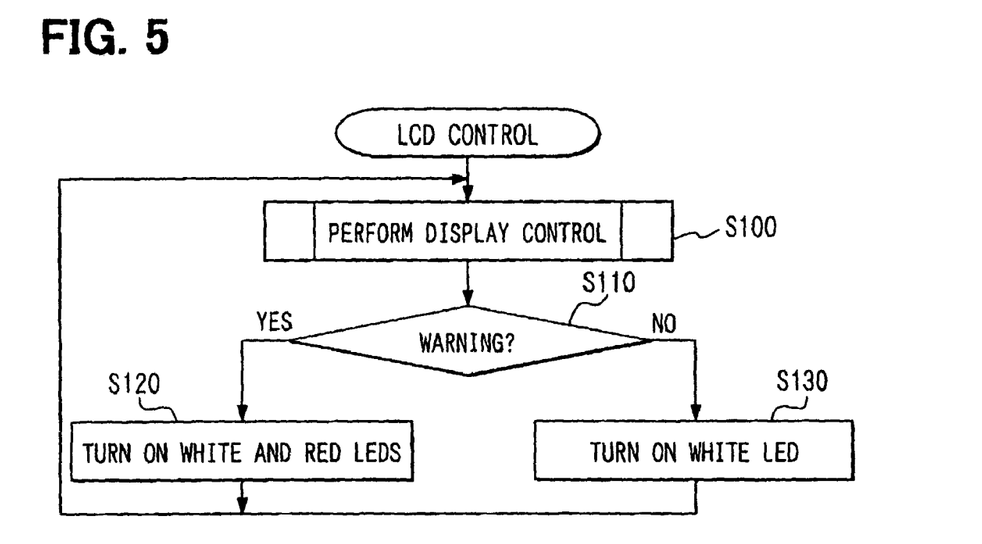
FIG. 5 is a flowchart of a display control process performed by an LCD ECU according to the first embodiment.

The CPU 31 performs the LCD control process as shown in FIG. 5 when the accessory switch is turned on and the LCD 2 and the LCD ECU 3 are turned on. The process is repeated until the accessory switch is turned off. A LCD display control is performed for selecting the information to be displayed on the screen 23 (S100). In the display control, the information to be displayed on the screen 23 is determined and image data required for displaying the information is produced. Then, a display signal S1 for displaying the selected information is outputted to the display switching interface circuit 35.

It is determined whether the selected information is a warning (S110). If the information is a warning, a control signal S2 is outputted to the LCD 2 for turning on the white LED 90a and the red LED 90b (S120). If the information is not a warning, a control signal S2 is outputted to the LCD 2 for turning on only the white LED 90a (S130).

When the warning is displayed in red on the screen 23, the red LED 90b is turned on in addition to the white LED 90a. As a result, the intensity of the warning lamp improves and the user can easily recognize the warning sign.

LCDs other than the TFT-LCD may be used. Backlight-type LCDs may be used instead of the sidelight-type LCD. When using the backlight-type LCD and the warning sign is displayed in the entire area of the screen 23, the red LEDs should be evenly arranged. When the warning sign is displayed in a predetermined area of the screen 23, the red LEDs should be arranged in an area corresponding to the predetermined area.

Second Embodiment

Figure 6:
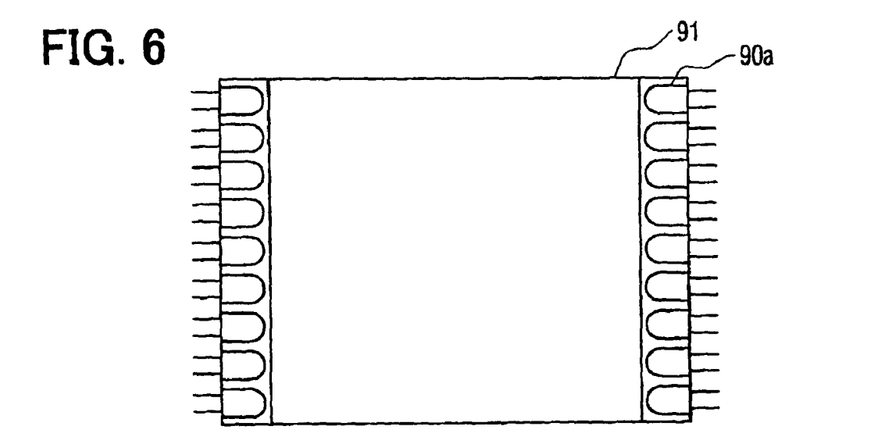
FIG. 6 is a schematic view of the LCD showing arrangements of light sources (LEDs) according to the second embodiment of the present invention.

Referring to FIG. 6, the LCD 2 includes only white LEDs 90a as light sources. The white LEDs 90a have capabilities of producing light that provides enough brightness for normal full-color display at 80% of the maximum intensity Imax. Therefore, the white LEDs 90 are turned on at 80% of the maximum intensity Imax for the normal full-color display and at 100% of the maximum intensity Imax for warning sign display.

Figure 7:
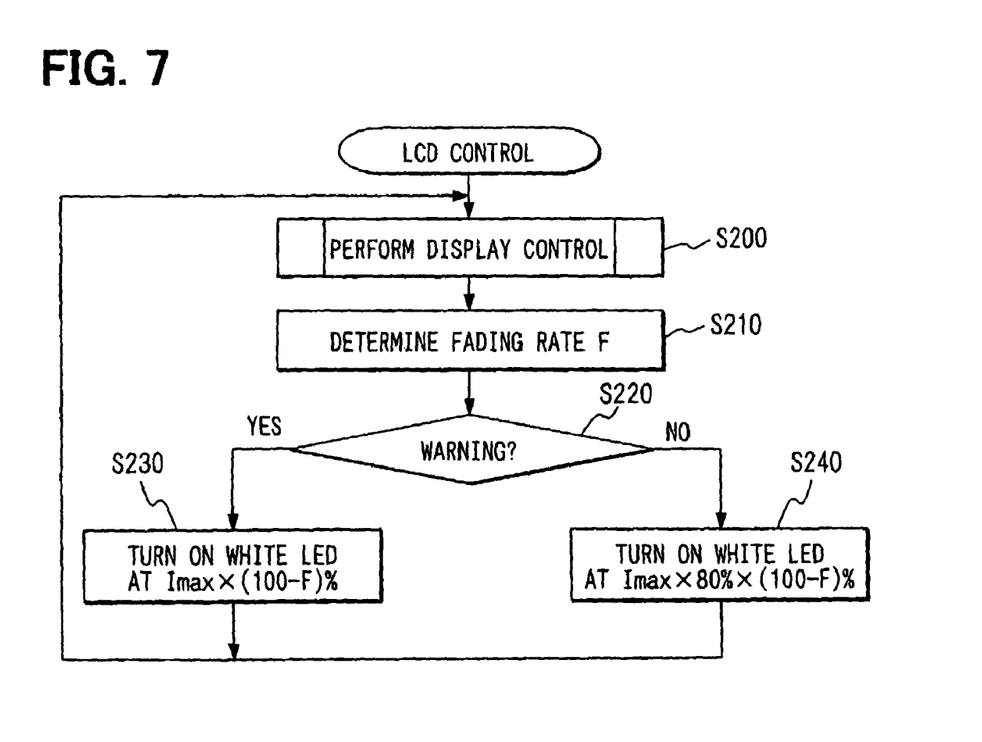
FIG. 7 is a flowchart of a display control process performed by an LCD ECU according to the second embodiment.

The above-described control is performed by the LCD ECU 3 as shown in FIG. 7. A LCD display control is performed for selecting the information to be displayed on the screen 23 (S200). In the display control, the information to be displayed on the screen 23 is determined and image data required for displaying the information is produced. Then, a fading rate F, which is a rate at which the intensity of each white LED 90a is reduced from a predetermined intensity, is determined (S210).

More specifically, the LCD ECU 3 receives an intensity signal indicative of ambient light around the LCD 2 from the LCD 2 or a light sensor (not shown) and determines the fading rate F. The fading rate F is used for controlling the intensity of the white LEDs 90a so that the ambient light around the LCD 2 and the intensity of the LCD 2 maintain a predetermined relation. When the predetermined relation is maintained, the visibility of the images displayed on the screen 23 is improved.

It is determined whether the selected information is a warning (S220). If the information is a warning, the intensity of the white LED 90a is set to [Imax×(100−F)]% (S230). Then, a control signal S2 is outputted to the LCD 2 for turning on the white LED 90a at that intensity. If the information is not a warning, the intensity of the white LED 90a is set to [Imax×80%×(100−F)]%. Then, a control signal S2 is outputted to the LCD 2 for turning on the white LED 90a at that intensity (S240).

The intensity of the warning indicator is ensured by controlling the intensity of the white LED 90a without the red LED. As a result, the red LED is not required for the light source of the LCD 2. This embodiment can be applied for warning sign displayed in one color other than red or in any colors other than a predefined color. It is more effective when the warning sign is displayed in a color similar to one of the RGB, which may be almost the same color, or a mixed color of one of the RGB and another one of the RGB having less intensity.

Backlight-type LCDs may be used instead of the sidelight-type LCD. When using the backlight-type LCD and the warning sign is displayed in the entire area of the screen 23, the white LEDs are arranged in an area corresponding to the entire area of the screen 23. The white LEDs have capabilities of producing light that provides enough brightness for normal display at 80% of the maximum intensity Imax. The white LEDs are arranged in an area corresponding to the warning display area 27. The white LEDs having capabilities of producing light that provides enough brightness for normal display at 100% of the maximum intensity Imax are arranged in the rest of the area.

The LCD ECU 3 performs an LCD display process similar to the one shown in FIG. 6. At step S240, the intensity of the white LEDs located outside the warning display area 27 is set to [Imax×(100−F)]% and that of the white LEDs located in the warning display area to [Imax×80%×(100−F)]%. The white LEDs outside the warning display area 27 are normally turned on at the intensity of [Imax×(100−F)]%.

Third Embodiment

Figures 8A, 8B:
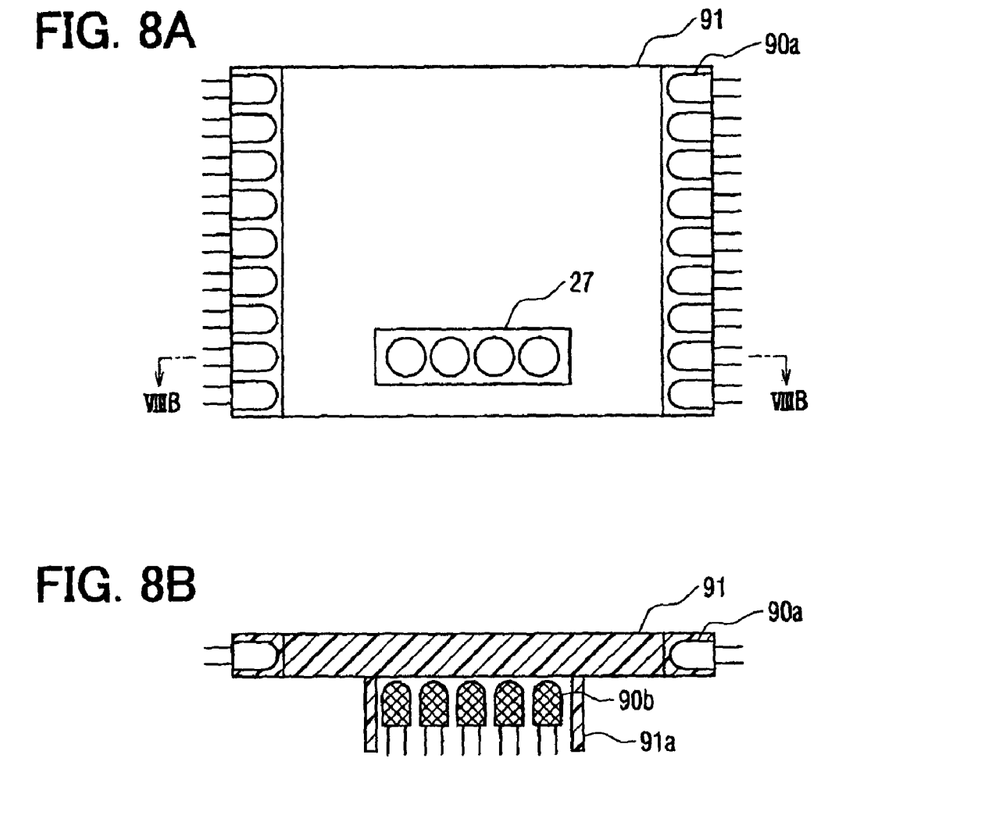
FIG. 8A is a schematic view of the LCD showing arrangements of light sources (LEDs) according to the third embodiment of the present invention.
FIG. 8B is a cross-sectional view taken along line IIX—IIX of FIG. 8A for the LCD according to the third embodiment.

Referring to FIG. 8A, a warning display area 27 is provided in a part of the display screen 23. White LEDs 90a are arranged at both side edge of the light guide plate 91. Red LEDs 90b are arranged behind the warning display area 27, which is a predetermined display area, of the light guide plate 91. Light shielding plates 91a are mounted around the red LEDs 90b for reducing a leak of light.

The CPU 31 performs the LCD control process in the same manner as the first embodiment shown in FIG. 5. However, warning information is selected for display in the warning display area 27 and information other than the warning information is selected for display in the rest of the screen 23 in step S100. In other words, the warning information and the other information are displayed on the screen 23 simultaneously.

Fourth Embodiment

Figure 9:
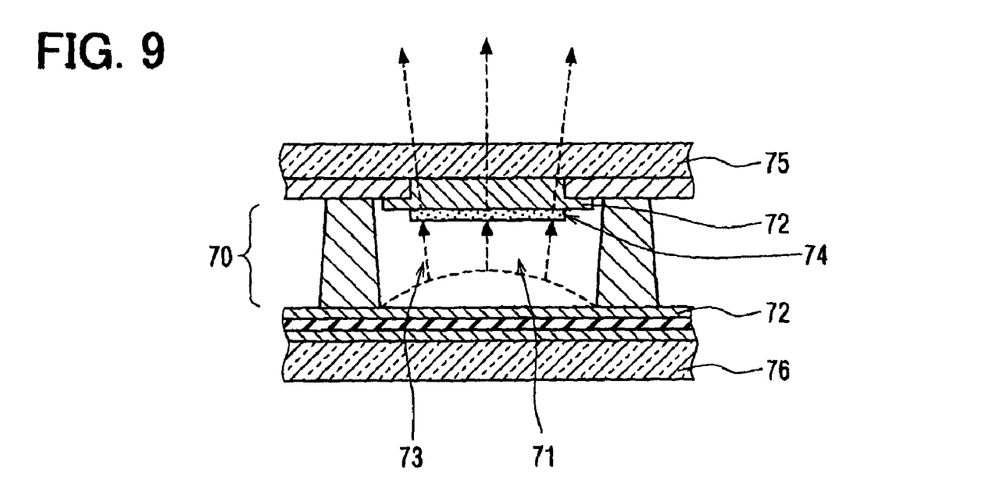
FIG. 9 is a cross-sectional view of a display cell (discharge cell) of a plasma display panel (PDP) according to the fourth embodiment of the present invention.

A plasma display panel (PDP) includes discharge cells, each of which emits red, green, or blue light, for each pixel that is an element of a display screen. Referring to FIG. 9, the discharge cell 70 that emits red light has sealed-in xenon mixture 71, and electrodes 72 for applying a voltage to the xenon mixture 71. When the voltage is applied to the xenon mixture 71, ultraviolet rays are emitted by a discharge. The ultraviolet rays excite red phosphors 74 and the red phosphors 74 emit red light.

The discharge cells 70 are arranged between the front glass substrate 75 and the rear glass substrate 76 so that each cell corresponds to a respective pixel. A PDP ECU, which is a display control means, controls the intensity of the discharge cell 70 for full-color display. The discharge cells 70 have capabilities of producing light that provides enough brightness for normal full-color display at 80% of the maximum intensity. Therefore, the discharge cells 70 emit light at 80% of the maximum intensity for display other than a warning sign, and at 100% of the maximum intensity for warning sign display.

Fifth Embodiment

Figure 10:
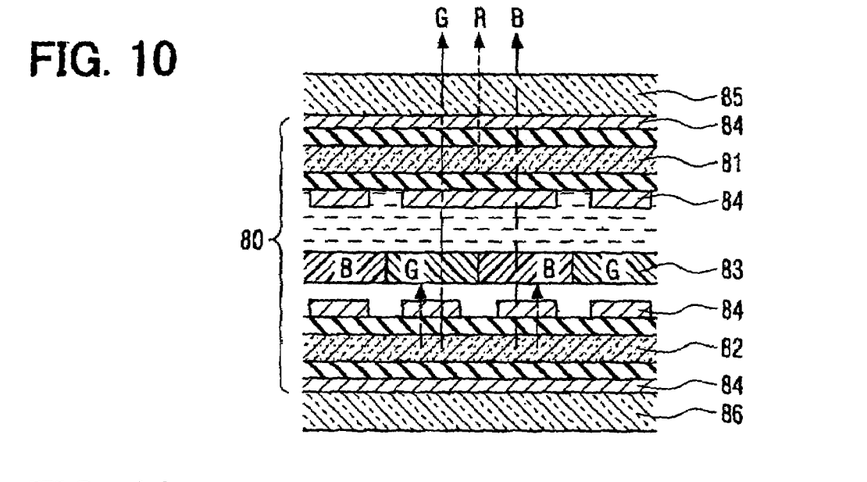
FIG. 10 is a cross-sectional view of a light emitting element (electroluminescence element) of an electroluminescent display (ELD) according to the fifth embodiment of the present invention.
Figure 11:
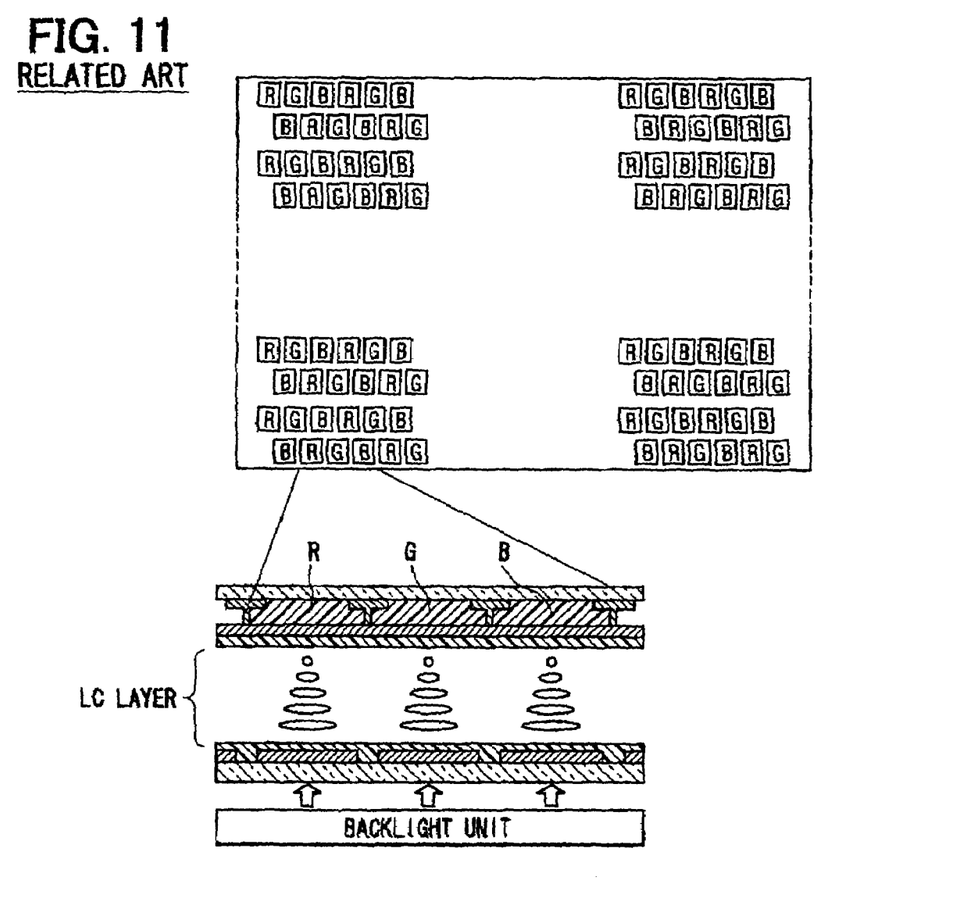
FIG. 11 is an explanatory view of a full-color LCD according to a related art.

Referring to FIG. 10, an electroluminescent (EL) element 80 includes a red phosphor layer 81, a blue-green phosphor layer 82, and a color filter layer 83. The color filter layer 83 selectively passes light transmitted form the blue-green phosphor layer 82. When a voltage is applied to electrodes 84, the layers 81 and 82 are excited and the light in respective color is emitted from each layer 81, 82. The EL element 80 is arranged between the front glass substrate 85 and the rear glass substrate 86 so that each cell corresponds to a respective pixel.

An ELD ECU, which is a display control means, controls the intensity of the each phosphor layer 81, 82 for full-color display. The EL elements 80 have capabilities of producing light that provides enough brightness for normal full-color display at 80% of the maximum intensity. Therefore, the EL elements 80 emit light at 80% of the maximum intensity for display other than a warning sign, and at 100% of the maximum intensity for warning sign display.

The present invention should not be limited to the embodiment previously discussed and shown in the figures, but may be implemented in various ways without departing from the spirit of the invention. For example, cold cathode tubes (CCTs) may be used in the backlight unit 22 as light sources.

An LCD without a color filter lay r such as the layer 97 may be used. In such an LCD, full-color images are displayed in a guest host (GH) mode. The LCD has a liquid crystal layer including layers for absorbing red light, green light, and blue light, respectively. Full-color images are displayed by controlling a voltage applied to each layer. An LCD having a backlight unit that includes a red light source, a green light source, and a blue light source for each pixel may be used. In this LCD, the color filter layer 97 is not included.

The warning sign may be displayed in orange using orange LEDs instead of the red LEDs. The intensity of the warning sign can be effectively maintained as the color of the LEDs for the warning sign is closer to the color of the warning sign. Information other than the warning sign may be displayed in a single color. However, it is more effective when the information that is important for the user is displayed in a single color.

The images displayed on the screen 23 may be reflected off a half mirror and the virtual images may be visible to the user. The display device can be applied to home appliances other than a vehicle.

What is claimed is:

1. A full-color display device comprising:
   a display panel that includes a display region consisting of a plurality of pixels;
   a light source unit that is arranged behind the display panel and emits light including components of three primary colors of light, which are red, green, blue, to the display panel;
   a display control means that controls intensity of the components of three primary colors of light that is emitted from the light source unit to a front surface of the display for displaying a full-color image in the display region, wherein
   the display control means controls intensity of light emitted from the light source unit;
   the intensity is set higher for displaying an image in a single color similar to one of the three primary colors in a predetermined region that includes at least a part of the display region than for displaying an image in a mixed color;
   the intensity is set lower than a maximum intensity of light emitted from the light source unit to the predetermined region when an image is displayed in a mixed color in the predetermined region; and
   the intensity is set higher than the set intensity when an image is displayed in a single color in the predetermined region.

2. The full-color display device according to claim 1, wherein the display panel is a liquid crystal panel having a liquid crystal layer.

3. The full-color display device according to claim 2, wherein:
   the light source unit includes a white light source; and
   the display panel includes red, green, and blue filters for each pixel for selectively passing light emitted from the white light source.

4. The full-color display device according to claim 2, wherein the light source in the light source unit is a light emitting diode.

5. The full-color display device according to claim 2, wherein the light source in the light source unit is a cold cathode tube.

6. The full-color display device according to claim 1, wherein the single color in which the image is displayed is one of red and orange.

7. The full-color display device according to claim 1, wherein the display control means controls the intensity for displaying a warning sign.

8. The full-color display device according to claim 1, wherein the single color in which the image is displayed is one of red and orange.

9. The full-color display device according to claim 1, wherein the display control means controls the intensity for displaying a warning sign.

10. A full-color display device comprising:
    a display panel that includes a display region consisting of a plurality of pixels;
    a light source unit that is arranged behind the display panel and emits light including components of three primary colors of light, which are red, green, blue, to the display panel;
    a display control means that controls intensity of the components of three primary colors of light that is emitted from the light source unit to a front surface of the display for displaying a full-color image in the display region, wherein
    the display control means controls intensity of light emitted from the light source unit;
    the intensity is set higher for displaying an image in a single color similar to one of the three primary colors in a predetermined region that includes at least a part of the display region than for displaying an image in a mixed color;
    the light source unit comprises a plurality of light sources for the predetermined region;
    the display control means turns on some of the light sources for displaying an image in a mixed color; and
    the display control means turns on more light sources in addition to the light sources turned off for displaying the image in a mixed color when displaying an image in a single color.

11. The full-color display device according to claim 10, wherein:
    the light sources includes a first light source that emits light in a predetermined color similar to the single color in which the image is displayed and a second light source that emits light in a mixed color; and
    the display control means turns on the second light source when displaying an image in a mixed color and turns on the first light source in addition to the second light source when displaying an image in a single color.

12. The full-color display device according to claim 11, wherein the predetermined color is one of red and orange.

13. A full-color display device comprising:
    a display panel that includes a display region consisting of a plurality of pixels;
    a plurality of light emitting units that is arranged for each pixel and emits light including three primary color components; and a display control means that controls intensity of the three primary color components of each light emitting unit for displaying a full-color image in the display region, wherein the display control means controls intensity of light emitted from the light emitting unit, the intensity for displaying an image in a mixed color in a predetermined region is set lower than a maximum intensity of the light, where the predetermined region includes at least a part of the display region, and the intensity for displaying the image in a single color is set higher than the intensity for displaying an image in a mixed color.

14. The full-color display device according to claim 13, wherein:

each light emitting unit includes at least one discharge cell that emits light when a phosphor is exposed to ultraviolet rays produced by a discharge and excited; and each pixel emits any one of red, green, and blue light as a component of light emitted from a respective discharge cell.

15. The full-color display device according to claim 13, wherein:

each light emitting unit includes at least one layer of a phosphor layer;

each light emitting unit is an electroluminescent element that emits light by exciting the phosphor layer to excite by applying a voltage; and each pixel emits any one of red, green, and blue light as a component of the light emitted from one of the phosphor layer include in the electroluminescent element.

16. The full-color display device according to claim 13, wherein the single color in which the image is displayed is one of red and orange.

17. The full-color display device according to claim 13, wherein the display control means controls the intensity for displaying a warning sign.

* * * * *